United States Patent [19]

Murakami et al.

[11] Patent Number: 5,715,485
[45] Date of Patent: Feb. 3, 1998

[54] APPARATUS FOR DISPLAYING PHOTOGRAPHING INFORMATION FOR A CAMERA

[75] Inventors: Naoyuki Murakami, Kawasaki; Kimio Uematsu, Tokyo; Nobuaki Sasagaki; Masaharu Hara, both of Kawasaki, all of Japan

[73] Assignee: Nikon Corporation, Tokyo, Japan

[21] Appl. No.: 194,128

[22] Filed: Feb. 9, 1994

Related U.S. Application Data

[63] Continuation-in-part of Ser. No. 801,908, Dec. 3, 1991, abandoned.

[30] Foreign Application Priority Data

Dec. 20, 1990 [JP] Japan ................. 2-412472

[51] Int. Cl.$^6$ .................................... G03B 17/18
[52] U.S. Cl. ............................. 396/291; 396/292
[58] Field of Search ............... 354/289.1, 289.12, 354/465, 471, 474, 475; 396/281, 287, 291, 292, 297

[56] References Cited

U.S. PATENT DOCUMENTS

| | | | |
|---|---|---|---|
| 4,118,716 | 10/1978 | Suzuki et al. | 354/442 |
| 4,461,560 | 7/1984 | Yoshino et al. | 354/475 |
| 4,480,903 | 11/1984 | Fujino et al. | 354/465 |
| 4,647,176 | 3/1987 | Shimizu et al. | 354/475 |
| 4,692,008 | 9/1987 | Arakawa et al. | 354/289.12 X |
| 5,142,320 | 8/1992 | Nakano et al. | 354/471 |
| 5,223,888 | 6/1993 | Fukhahori | 354/475 |
| 5,298,936 | 3/1994 | Akitake et al. | 354/471 |

FOREIGN PATENT DOCUMENTS 58-136019  8/1983  Japan.

Primary Examiner—Safet Metjahic
Assistant Examiner—J. K. Han
Attorney, Agent, or Firm—Shapiro and Shapiro

[57] ABSTRACT

A photographing information setting apparatus for a camera has a capability of improving the operativity in setting photographing information by displaying all of the photographing information or a part thereof contained in a photographing information group when such a group is selected by an information group selecting device. In selecting photographing information, a photographing information group containing exposing modes, shutter speeds, and others is selected by the information group selecting device and at least two pieces of photographing information contained in this photographing information group are displayed in a display. For example, when a photographing information group regarding exposing modes is selected, the exposing modes PM, P, S, A and M are displayed in the display. Then, when a photographing information is further set by an information setting device from the selected photographing information group, such a photographing information is displayed in the display in a state where this information is distinguished from the other pieces of photographing information. In other words, the standard automatic exposing mode P is displayed in the display in such a manner if it is set, for example.

12 Claims, 17 Drawing Sheets

APPARATUS FOR DISPLAYING PHOTOGRAPHING INFORMATION FOR A CAMERA

This is a continuation-in-part of application Ser. No. 07/801,908, filed Dec. 3, 1991, now abandoned.

BACKGROUND OF THE INVENTION

1. Field of the Invention

The present invention relates to an apparatus for setting photographing information for a camera. More particularly, the invention relates to an improvement of a method of displaying selected photographing information.

2. Related Background Art

There is known an apparatus for setting photographing information for a camera (disclosed, for example, in Japanese Patent Laid-Open Application No. 58-136019), in which various pieces of photographing information for a camera are divided into a plurality of photographing information groups in accordance with the contents of such information regarding its exposing mode, film feeding mode, film speed, and the like, and when setting the photographing information, the photographing information group is first selected and then any one of the required pieces of information is set from the selected photographing information group.

In an apparatus of this kind, the exposing mode, for example, is selected from the photographing information group by an operational member for selecting the photographing information group (hereinafter referred to as mode switch). Subsequently, the shutter speed preferential automatic exposing mode is set, for example, from the selected exposing mode by an operational member for setting photographing information (hereinafter referred to as setting dial). Then, a symbol or abbreviated mark indicating that the shutter speed preferential automatic exposing mode has been set is displayed on a display.

Nevertheless, in the conventional apparatus, only the photographing information set by the setting dial is displayed on the display, and it is impossible to confirm the kinds of information contained in the photographing information group selected by the mode switch or the kinds of information available therein for selective use. As a result, a problem is encountered in that not only is this system inconvenient from the operational point of view, but it hinders the maximum utilization of the photographing functions which are abundantly provided therefor.

SUMMARY OF THE INVENTION

An object of the present invention is to provide an apparatus for setting photographing information for a camera capable of improving the operativity of setting a photographing information by displaying all the photographing information or a part thereof in a photographing information group when the photographing information group is selected by the mode switch.

In conjunction with FIG. 1, the present invention will be described. The invention is adaptable to an apparatus for setting photographing information for a camera, which is provided with photographing information selection devices 1 through 6 for selecting a photographing information group from plural kinds of photographing information groups, an information setting device 8 for setting photographing information from the selected photographing information group, and a display 10 for displaying the photographing information thus set by the information setting device 8.

When, any one of the photographing information groups is selected by the information group selection devices 1 through 6, at least two pieces of photographing information contained in the selected photographing information group are displayed. Subsequently, photographing information is set by the information setting device 8 from such photographing information group. There, is provided a display control device 9 to display the photographing information thus set so as to discriminate it from other pieces of photographing information currently in display, thus achieving the above-mentioned object.

The display control device 9 causes the display 10 to display at least two pieces of photographing information contained in any one of the photographing information groups when it has been selected by the information group selection devices 1 through 6. When a photographing information is set by the information setting device 8 out of the selected photographing information group, the display control device further causes the display 10 to display the information thus set in such a state where it can be discriminated from other pieces of the photographing information.

Accordingly, when any one of the photographing information groups is selected, at least two pieces of photographing information which can be set from the selected photographing information group are displayed. Hence, the operativity can be improved in setting the required photographing information.

DESCRIPTION OF THE PREFERRED EMBODIMENTS

Figure 1:
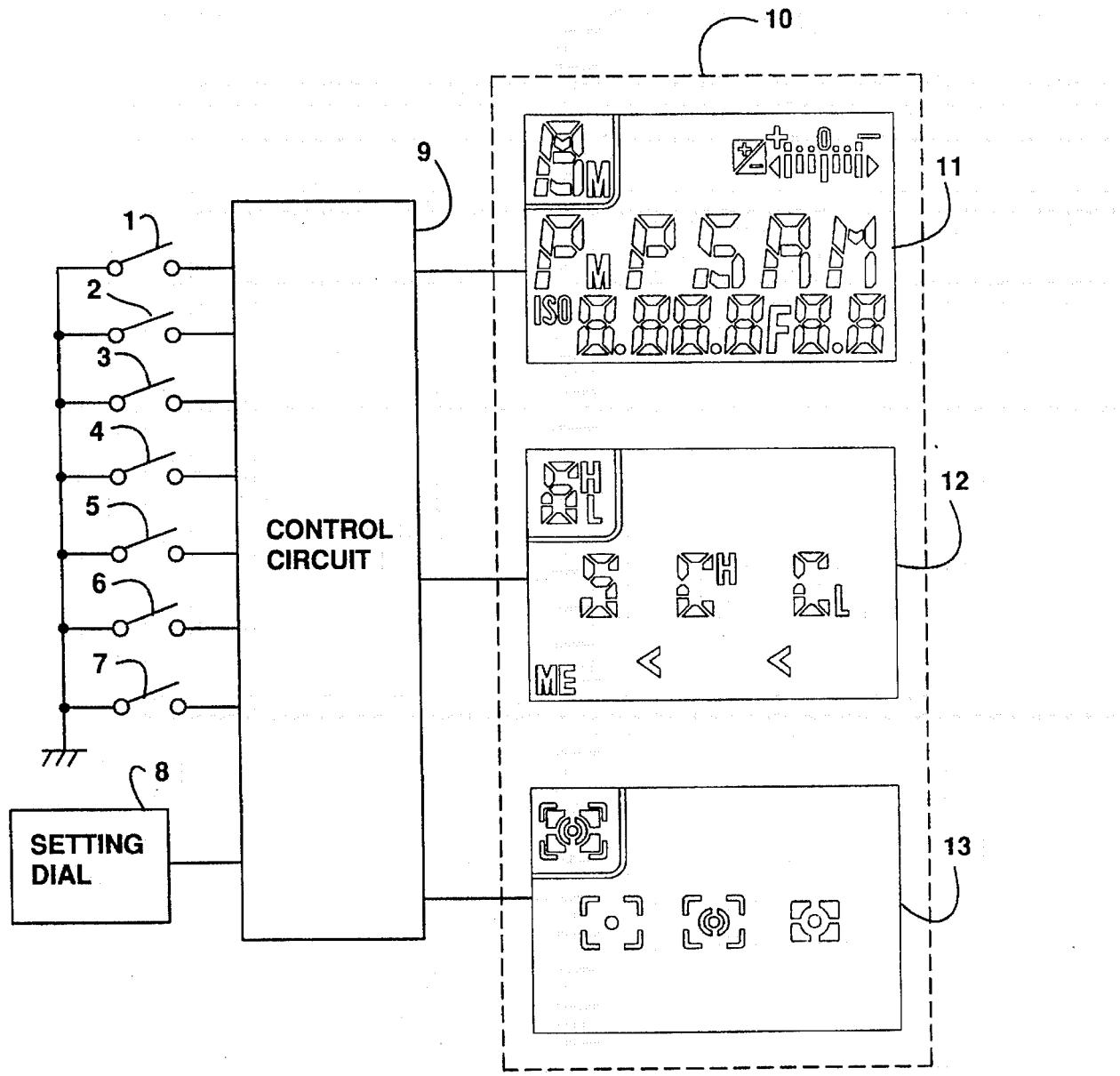
FIG. 1 is a block diagram illustrating the entire structure of an embodiment according to the present invention.
Figure 2:
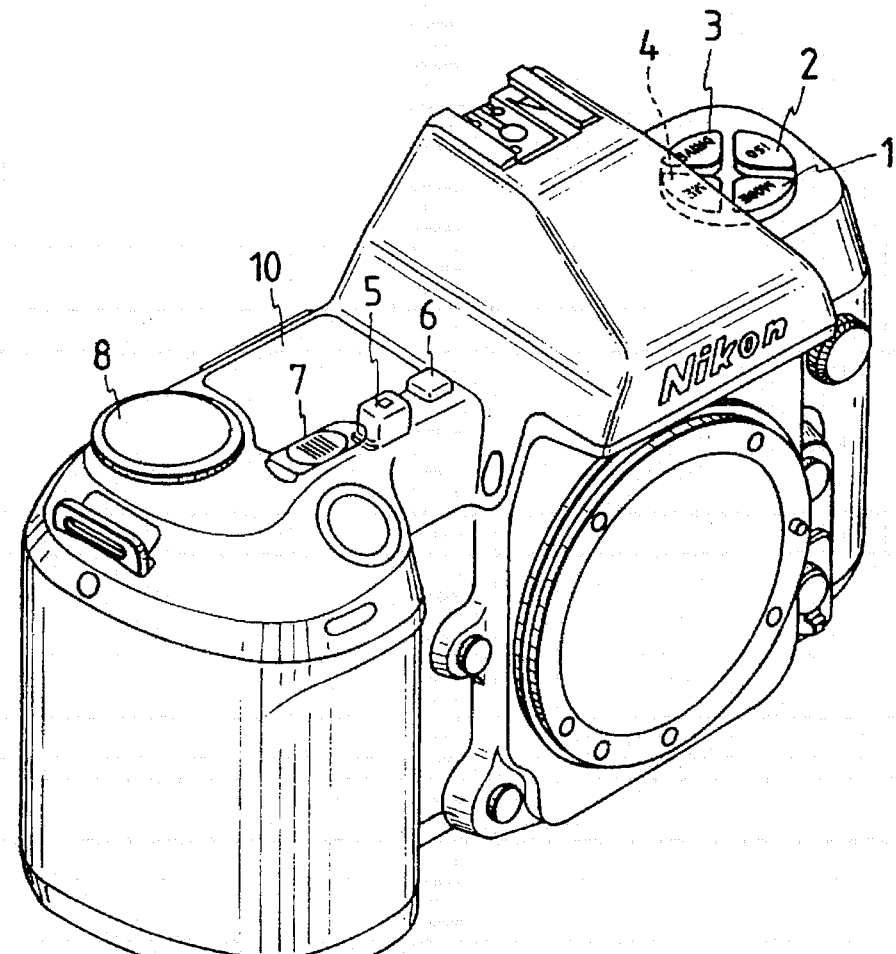
FIG. 2 is a view showing the outer appearance of a camera body provided with a photographing information setting device according to an embodiment of the present invention.

FIG. 1 is a block diagram showing the entire structure of an embodiment according to the present invention, and FIG. 2 is a perspective view illustrating the outer appearance of a camera body.

Figure 3:
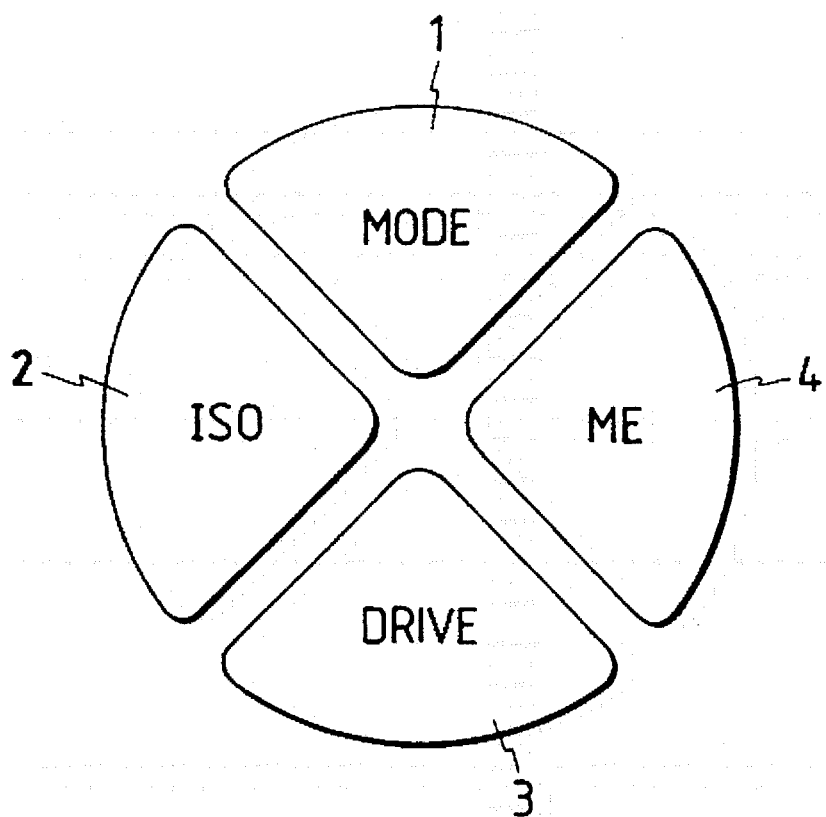
FIG. 3 is a view illustrating a mode switch.

A reference numeral 1 designates a mode switch (MODE) for selecting exposing modes; 2, a 10 mode switch (ISO) for selecting film speeds; 3, a mode switch (DRIVE) for selecting film feeding modes; and 4, a mode switch (ME) for selecting multi-exposing modes. In FIG. 3, the details of the mode switches 1 through 4 are shown. Further, a reference numeral 5 designates an exposure compensating mode selection switch and 6, a light metering mode selection switch. The above-mentioned photographing information group can be selected by operating any one of the mode switches 1 through 6.

Also, a reference numeral 7 designates a camera main switch and 8, a setting dial. It is possible to set desired photographing information from the selected photographing information group by turning the setting dial 8 while depressing any one of the mode switches 1 through 6. A reference numeral 9 designates a microcomputer and a control circuit comprising the peripheral circuits of the microcomputer, which execute a control program described later to control the display and setting of the photographing information. A reference numeral 10 designates a display for displaying photographing information.

Figure 4A:
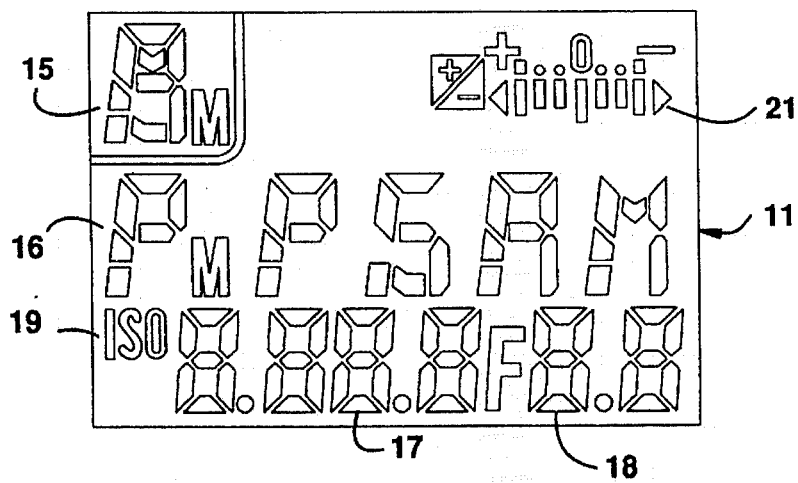
FIGS. 4A–4D are views showing the structure and displaying information of a display 10 of the embodiment of the invention.
Figure 4B:
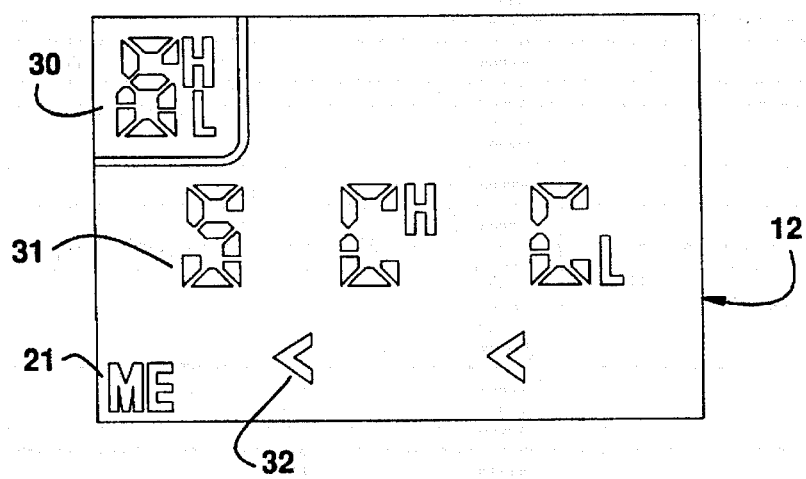
Figure 4C:
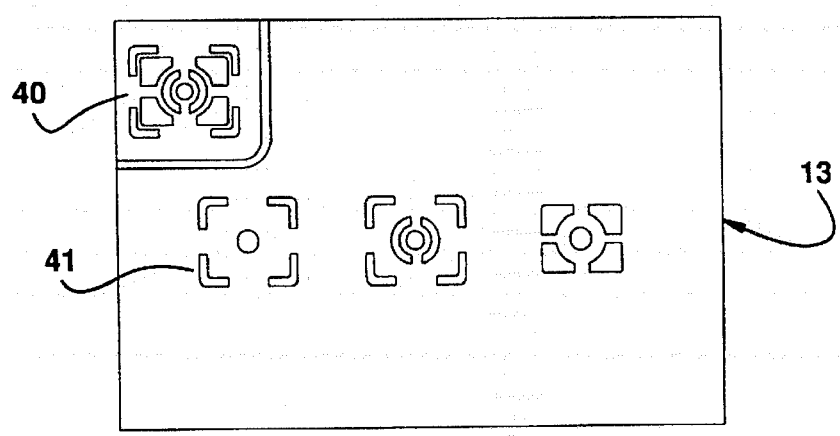
Figure 4D:
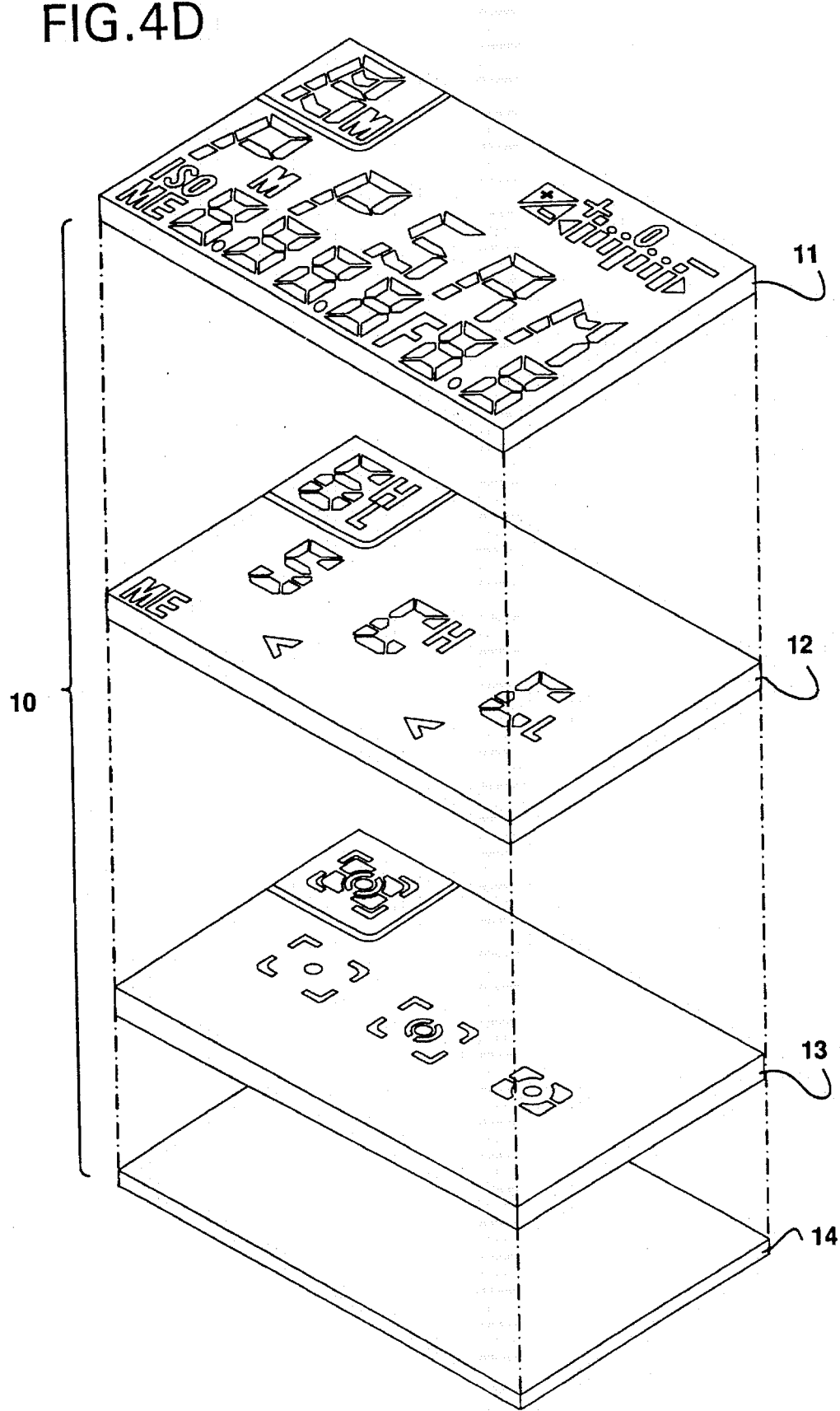

FIG. 4D is a perspective view of the display 10. The display 10 is formed by laminating of a first liquid crystal displaying portion 11, a second liquid crystal displaying portion 12, a third liquid crystal displaying portion 13 and a reflection plate 14. The first, second and third liquid crystal displaying portions 11–13 are a transmission liquid crystal displaying element which, when an electric supply is OFF, becomes transparent.

The display 10 comprises liquid crystals 15 through 26 having many displaying segments to enable displaying various pieces of photographing information which will be described later.

FIGS. 4A–4D show displaying states of a camera which are confirmed by the display 10. Information is displayed by using three liquid crystal portions 11–13.

FIG. 4A shows the first liquid crystal portion 11. In FIG. 4A, liquid crystals 15 display a set exposing mode. Liquid crystals 16 display settable exposing modes. Liquid crystals 17 display a shutter speed, ISO speed and a multi-exposing number. Liquid crystals 18 display an aperture value (f-number) and a photographed multi-exposing number. Liquid crystals 19 indicate that a numeral displayed by the liquid crystals 17 is an ISO speed. Liquid crystals 21 display an exposure compensating value.

FIG. 4B shows the second liquid crystal portion 12. In FIG. 4B, liquid crystals 30 show a set film supplying mode. Liquid crystals 31 show settable film supplying modes. Liquid crystals 20 indicate that a numeral displayed by the liquid crystals 17 is a multi-exposing number. Liquid crystals 32 display inequalities for showing a minimum number and maximum number in a multi-exposure. While the inequalities of the liquid crystals 32 are lit up, the minimum number in the multi-exposure and the set multi-exposing number are lit up by the liquid crystals 17 provided on the first liquid crystal portion 11, and the maximum number in the multi-exposure is lit up by the liquid crystals 18 provided on the first liquid crystal portion 11 so that the set multi-exposing number is displayed between the minimum number and the maximum number in the multi-exposure.

FIG. 4C shows the third liquid crystal portion 13. In FIG. 4C, liquid crystals 40 display a set light metering mode. Liquid crystals 41 display settable light metering modes.

Figure 5:
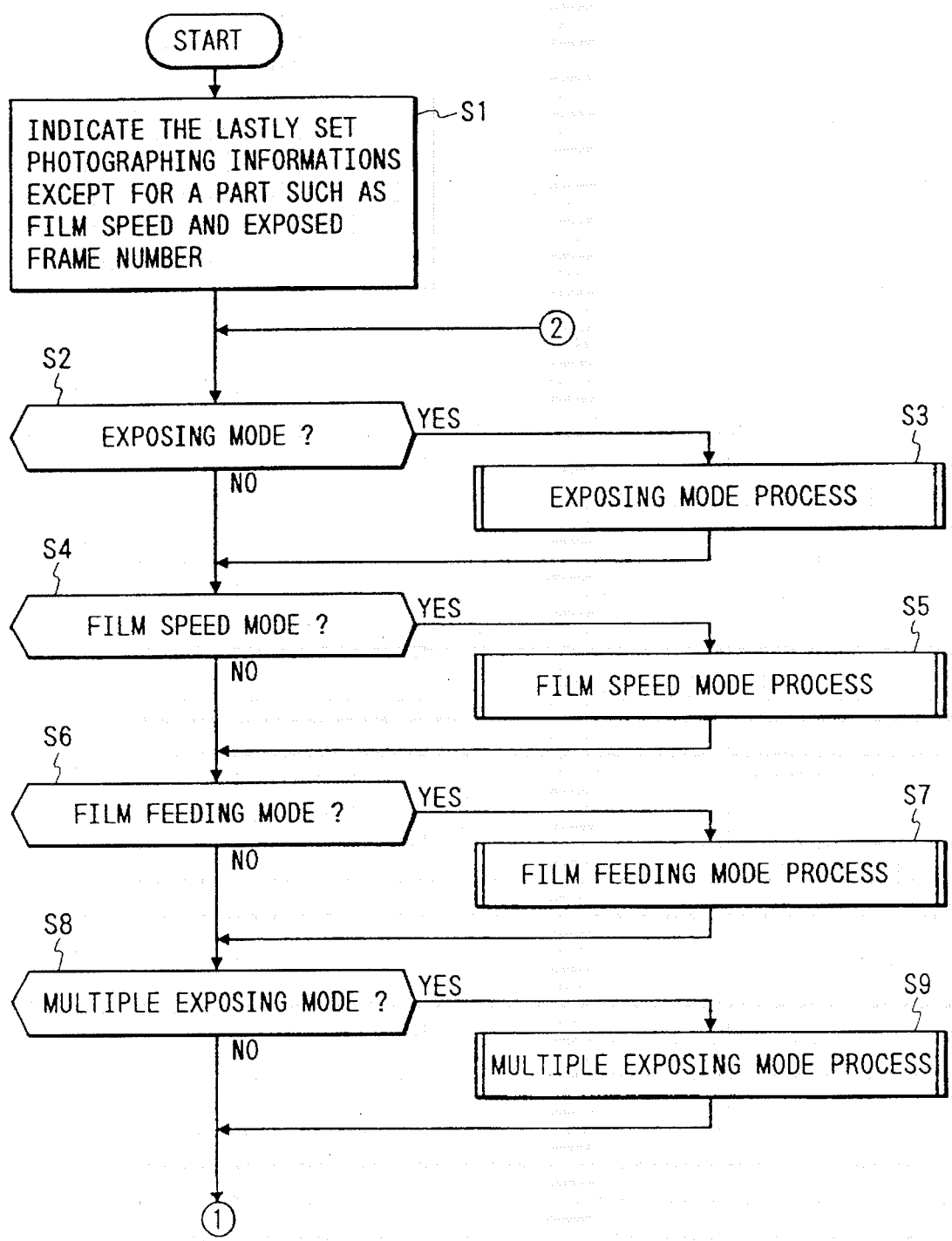
FIG. 5 is a flowchart showing the main program of the display control.
Figure 6:
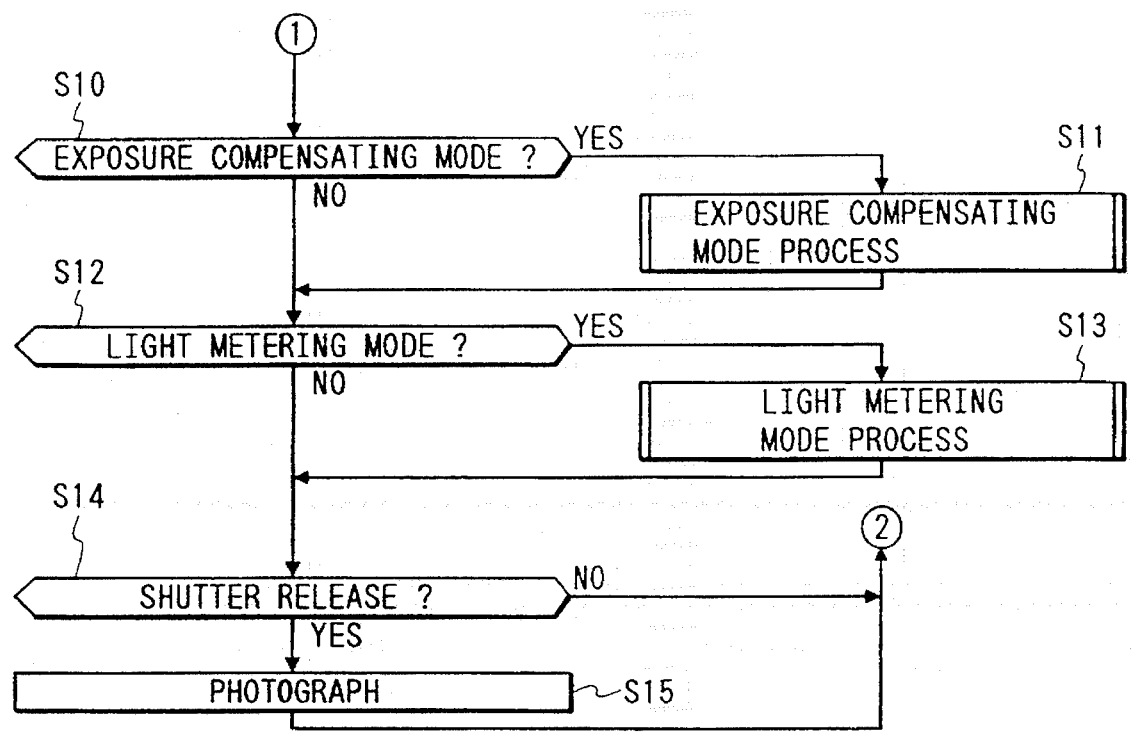
FIG. 6 is a flowchart showing the main program of the display control.

FIG. 5 and FIG. 6 are flowcharts showing the display control program to be executed in the control circuit 9. The operation will be described in accordance with these flowcharts.

When the camera main switch 7 is turned on, the execution of this program is started, and at first in step S1, each photographing information set in the previous use is displayed on the display 10 except the film speed and film photographing current frame number, which are displayed after the current situations have been confirmed. Also, in a case where the multi-exposing mode or exposure compensating mode are applied in the last photographing, the photographing information set for them in the previous use are all reset when the main switch 7 is turned off. Therefore, these modes are initialized and displayed as usual non-multiphotographing and non-exposure compensating conditions.

Figure 7:
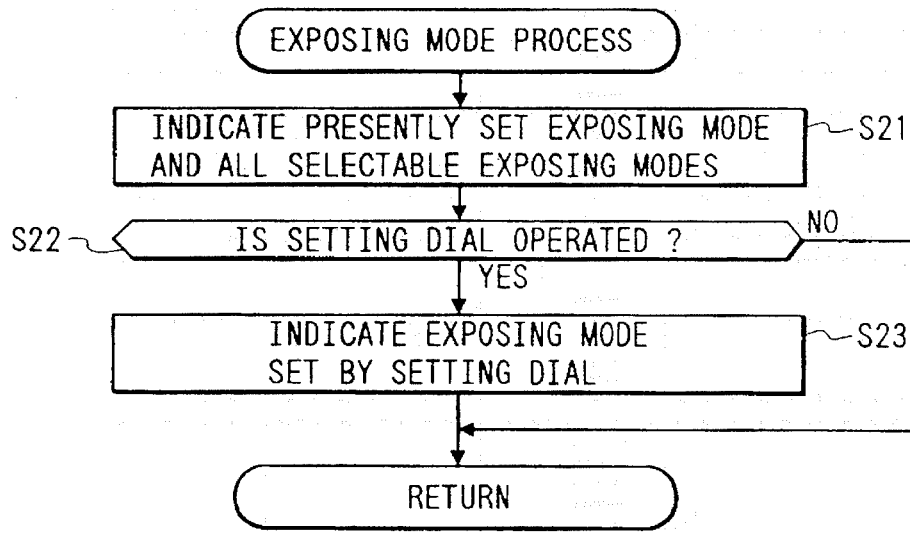
FIG. 7 is a flowchart showing the subroutine of an exposing mode process.
Figure 8:
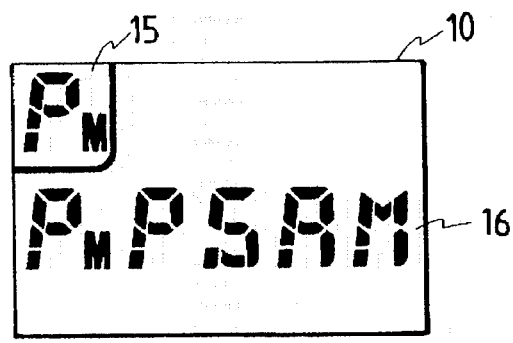
FIG. 8 is a view illustrating a displaying example of an exposing mode when a multiprogram automatic exposing mode is set.
Figure 9:
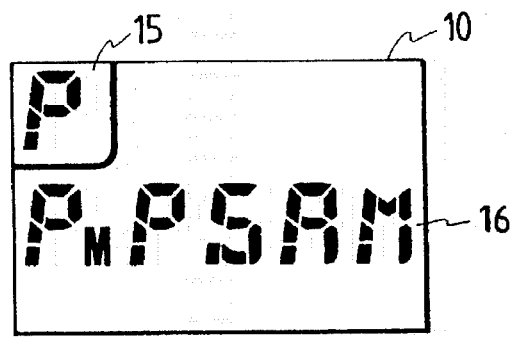
FIG. 9 is a view illustrating a displaying example of an exposing mode when a standard automatic exposing mode is set.
Figure 10:
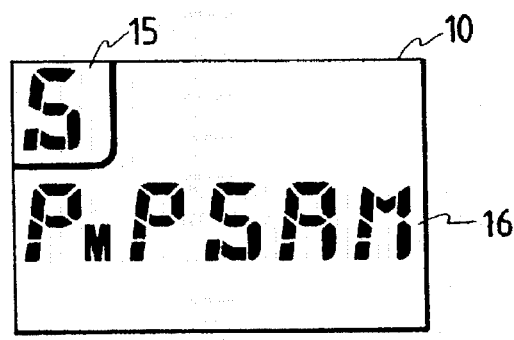
FIG. 10 is a view illustrating a displaying example of an exposing mode when a shutter speed preferential automatic exposing mode is set.
Figure 11:
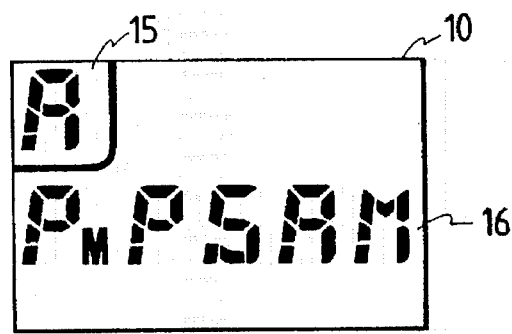
FIG. 11 is a view illustrating a displaying example of an exposing mode when a diaphragm preferential automatic exposing mode is set.
Figure 12:
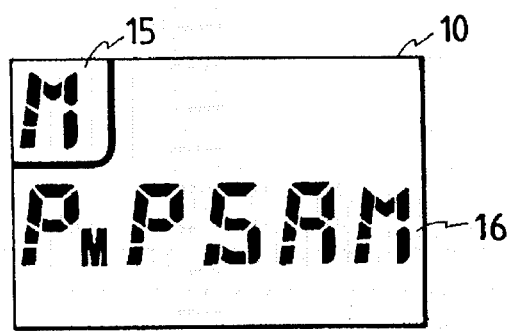
FIG. 12 is a view illustrating a displaying example of an exposing mode when a manual exposing mode is set.

In step S2, whether or not the exposing mode has been selected by the mode switch is examined, and if it has been selected, the process proceeds to step S3 to execute the exposing mode process subroutine shown in FIG. 7. Otherwise, the process proceeds to step S4. In step S21 in FIG. 7, the exposing mode currently set as shown in FIG. 8, i.e., the multi-program automatic exposing mode PM previously set, is displayed on the liquid crystal 15 and at the same time, all the photographing information that can be selected by the exposing mode, i.e., the multiprogram automatic exposing mode PM, standard automatic exposing mode P, shutter speed preferential automatic exposing mode S, diaphragm preferential automatic exposing mode A, and manual exposing mode M, are displayed on the central liquid crystal 16.

Subsequently, in step S22, whether a setting dial 8 has been operated or not is examined. If operated, the process proceeds to step S23 to display the exposing mode that has been set by the setting dial 8 on the liquid crystal 15. In this case, on the liquid crystal 15, an exposing mode is displayed sequentially as in FIG. 9 through FIG. 12 by the rotation of the setting dial 8. When the setting of the exposing mode is completed, the process returns to the step S4 shown in FIG. 5.

Figure 13:
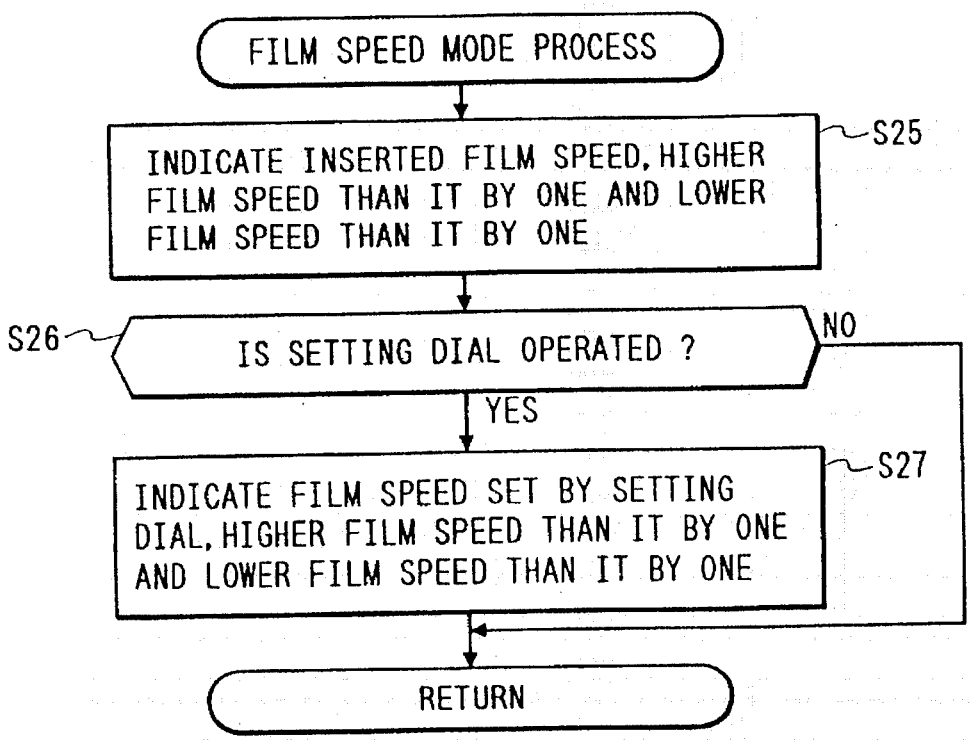
FIG. 13 is a flowchart showing the subroutine of a film speed process.

In the step S4, whether any film speed mode has been selected is examined by the mode switch 2. If selected, the process proceeds to step S5 to execute the film speed mode process subroutine shown in FIG. 13. Otherwise, the process proceeds to step S6. In step S25 shown in FIG. 13, the DX code which indicates the film speed loaded in the cartridge is read to display the reading result on the central liquid crystal 16 and at the same time, to display thereon a film speed which is one step slower than the currently loaded film on the left side thereof as well as a film speed which one step faster than that on the right side thereof. If, for example, the currently loaded film has a film speed of ISO 100, the film speed 100 is displayed in the center with the film speeds 80 and 125 on the left and right sides thereof respectively.

Next, in step S26, whether or not the setting dial 8 has been operated is examined. If operated, the process proceeds to step S27 to display the film speed set by the setting dial 8 as well as the film speeds one step slower and faster than that on the left and right sides thereof. Then, in the central liquid crystal 16, the film speed is displayed in such a manner that the film speed is made one step lower sequentially by rotating the setting dial 8 in one direction while it is made one step faster sequentially by rotating the setting dial 8 in the other direction. The setting range of film speeds is wide such as from ISO 6 to 6,400, and the entire range of the film speeds can be set. However, when a film speed is arbitrarily set for an intensified photographing, the film speed is often increased or decreased one or two steps more or less than the speed of the film which is currently loaded. It is therefore desirable to display the film speed which is one step faster or slower than the one set by the setting dial 8. If the setting dial 8 is not operated in step S26, the process returns to the step S6 in FIG. 5.

Figure 14:
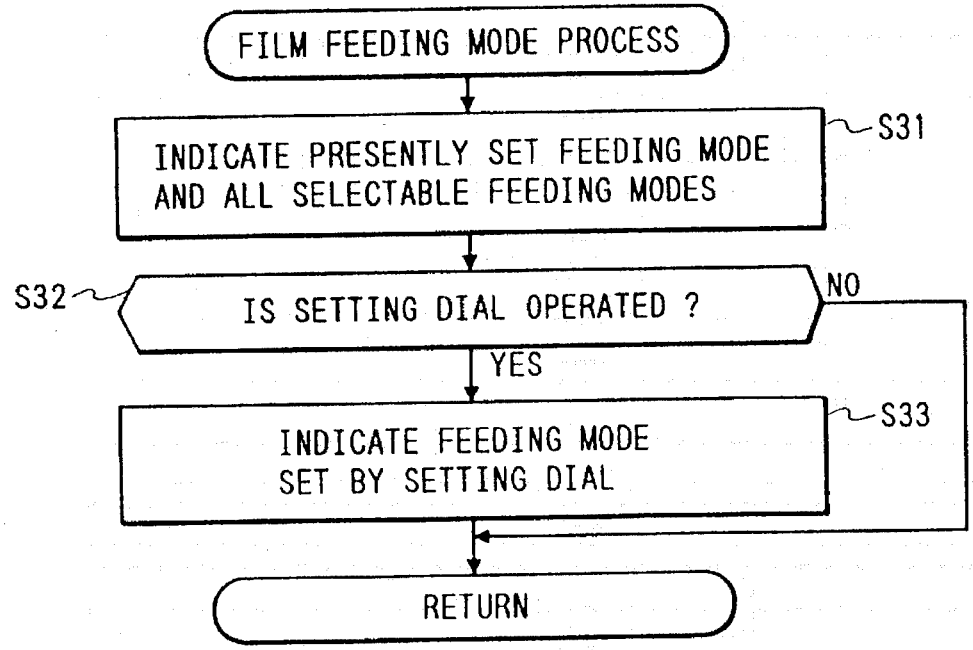
FIG. 14 is a flowchart showing the subroutine of a film feeding mode.
Figure 15:
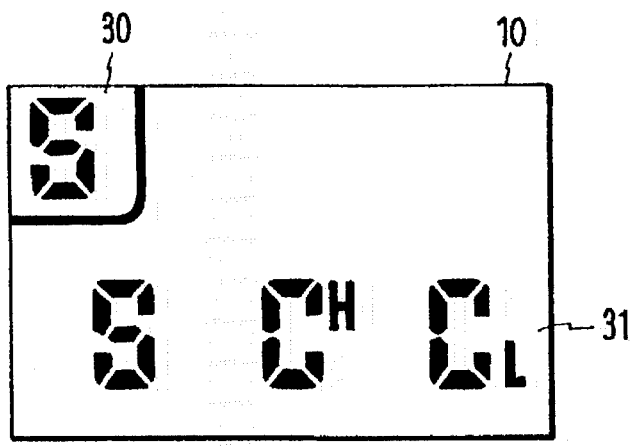
FIG. 15 is a view illustrating a displaying example of a film feeding mode when a single frame photographing mode is set.

In the step S6 in FIG. 5, whether or not the film supplying mode has been selected by the mode switch 3 is examined. If selected, the process proceeds to step S7 to execute the film supplying process subroutine shown in FIG. 14. If not selected, the process proceeds to step S8. In step S31 in FIG. 14, the currently set film supplying mode, i.e., the single frame photographing mode S previously set as shown in FIG. 15, is displayed, on the liquid crystal 30, and on the liquid crystal 31 are displayed all the supplying modes which can be selected, i.e., a single frame photographing mode S, high-speed continuous photographing mode CH, and low-speed continuous photographing mode CL.

Figure 16:
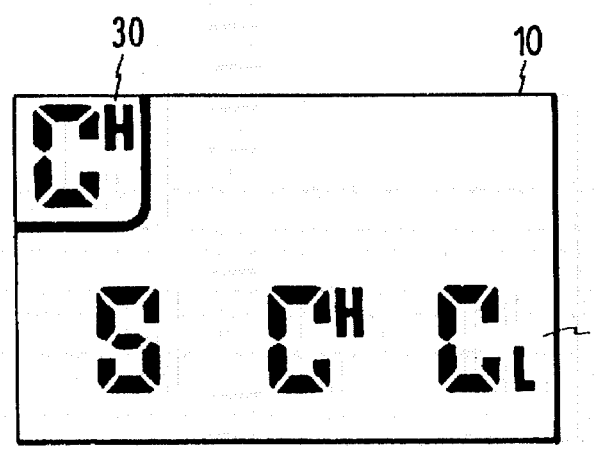
FIG. 16 is a view illustrating a displaying example of a film feeding mode when a high-speed continuous photographing mode is set.
Figure 17:
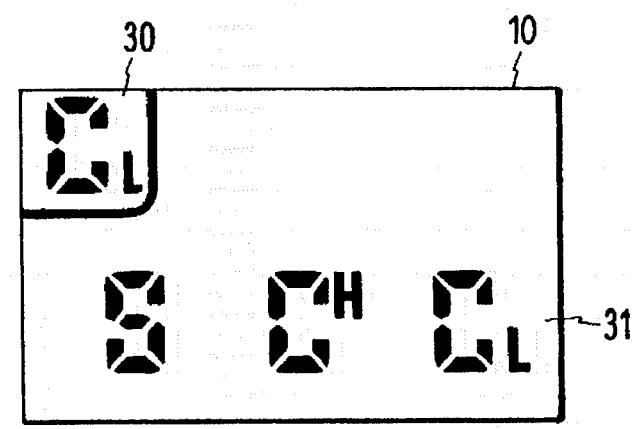
FIG. 17 is a view illustrating a displaying example of a film feeding mode when a low-speed continuous photographing mode is set.

Next, in step S32, whether or not the setting dial 8 has been operated is examined. If operated, the process proceeds to step S33 to display the supplying mode set by the setting dial 8 on the liquid crystal 30. Then, the film supplying modes are sequentially displayed on the liquid crystal 30 as shown in FIG. 16 and FIG. 17. If the setting dial 8 is not set in the step S32, the process returns to step S8 in FIG. 5.

Figure 19:
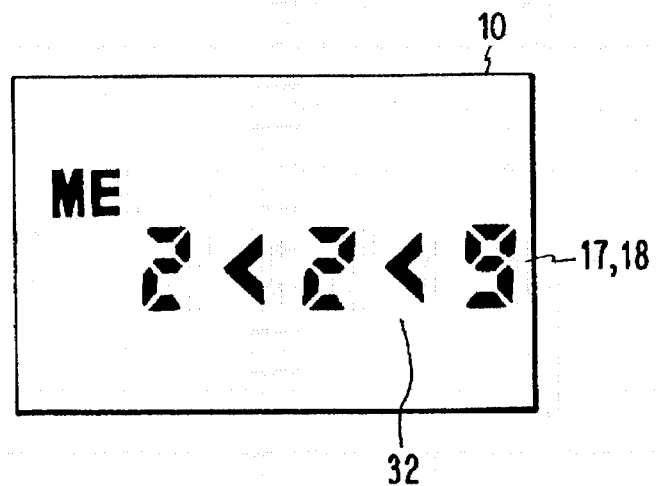
FIG. 19 is a view illustrating a displaying example of a multi-exposing mode when a multi-exposure number 2 is set.
Figure 18:
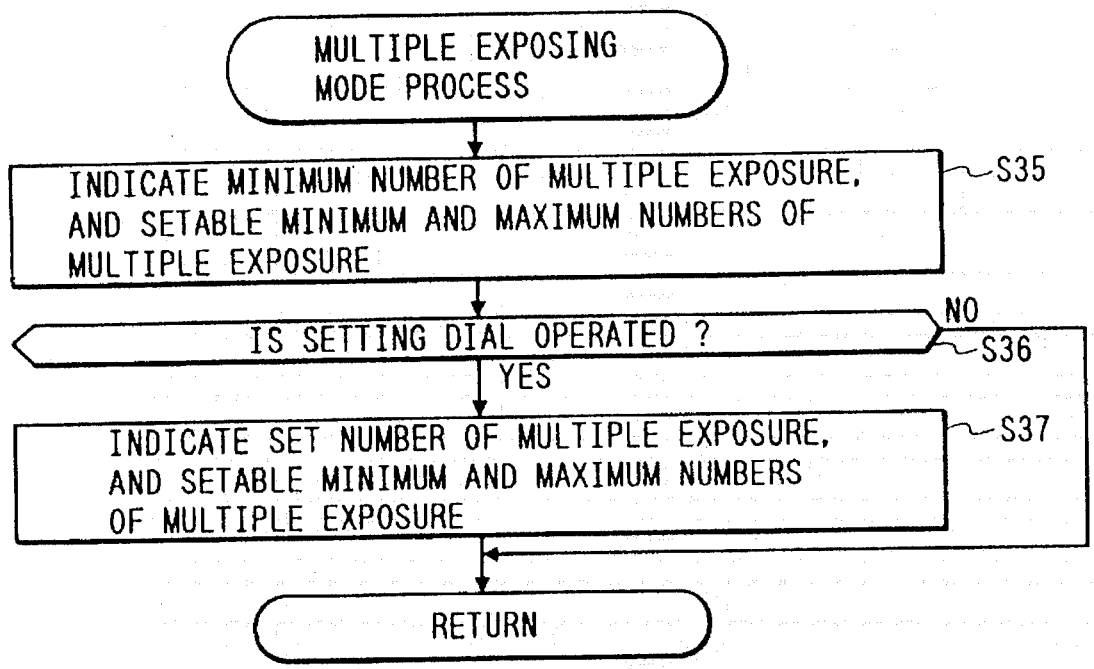
FIG. 18 is a flowchart showing the subroutine of a multi-exposing mode process.

In the step S8 in FIG. 5, whether or not a multi-exposing mode has been selected by the mode switch 4 is examined. If selected, the process proceeds to step S9 to execute the multi-exposing mode process subroutine shown in FIG. 18. In step S35 in FIG. 18, the minimum multi-exposing number and the range of the multi-exposing number that can be set are displayed in the central liquid crystals 17 and 18. If, for example, the multi-exposing number can be set in a range of 2 through 9, the minimum multi-exposing number 2 is displayed as shown in FIG. 19 together with the minimum number 2 and maximum number 9 on the left and right sides thereof respectively.

Figure 20:
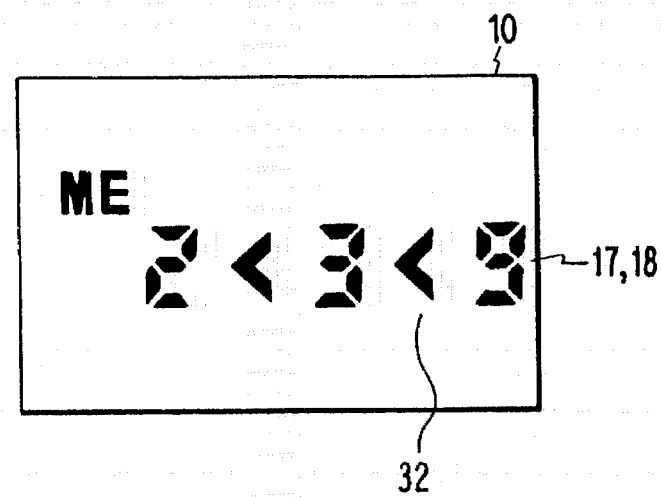
FIG. 20 is a view illustrating a displaying example of a multi-exposing mode when a multi-exposure number 3 is set.
Figure 21:
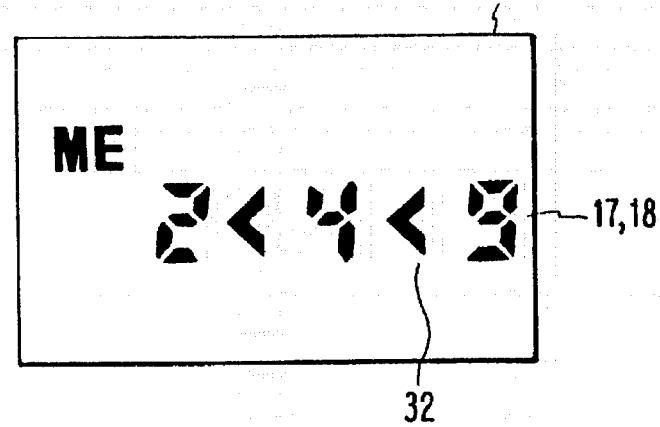
FIG. 21 is a view illustrating a displaying example of a multi-exposing mode when a multi-exposure number 4 is set.

Subsequently in step S36, whether or not the setting dial 8 has been operated is examined. If operated, the process proceeds to step S37 to display the multi-exposing number and the range of the multi-exposing numbers that can be selected. Then, in the center of the liquid crystals 17 and 18, the setting multi-exposing number is displayed in accordance with the rotation of the setting dial 8 as shown in FIG. 20 and FIG. 21. The setting range display on the left and right sides of the setting multi-exposing number is not changed even when the setting dial 8 is operated. If the setting dial 8 is not operated in the step S36, the process returns to step S10 in FIG. 6.

Figure 22:
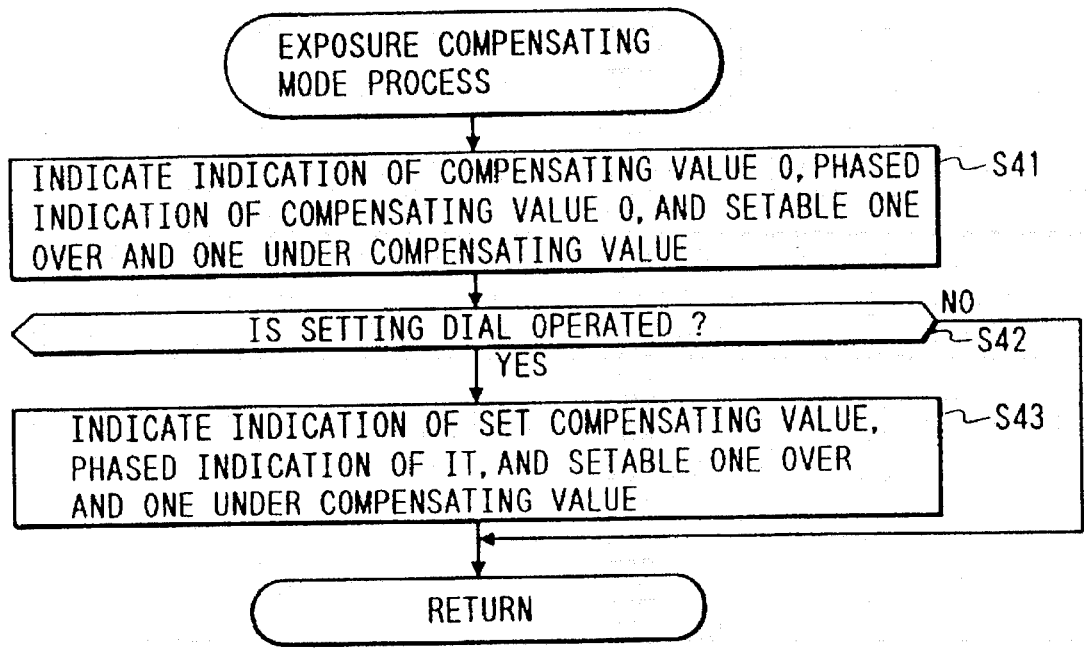
FIG. 22 is a view showing the subroutine of an exposure compensating mode process.
Figure 23:
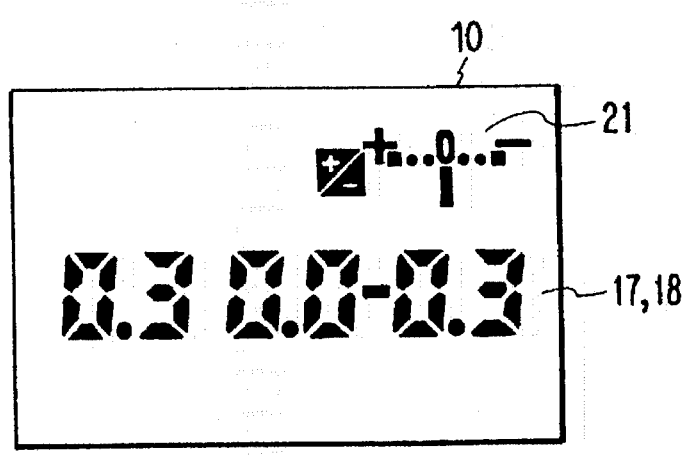
FIG. 23 is a view illustrating a displaying example of an exposure compensating mode when the compensating value 0.0 is set.
Figure 24:
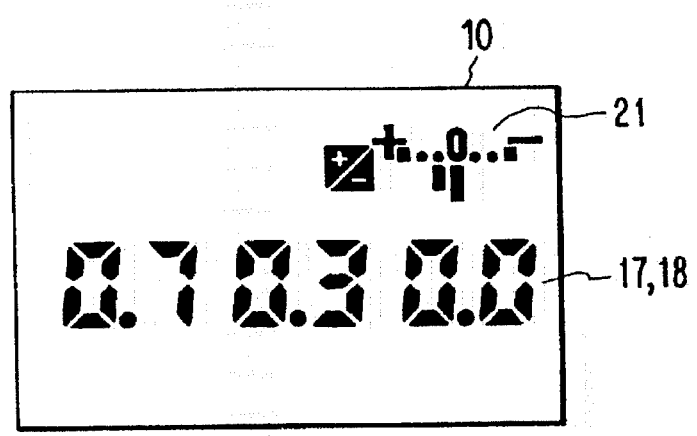
FIG. 24 is a view illustrating a displaying example of an exposure compensating mode when the compensating value 0.3 is set.
Figure 25:
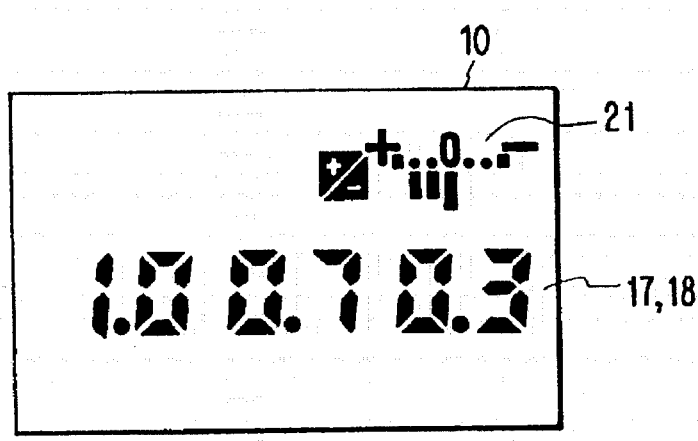
FIG. 25 is a view illustrating a displaying example of an exposure compensating mode when the compensating value 0.7 is set.
Figure 26:
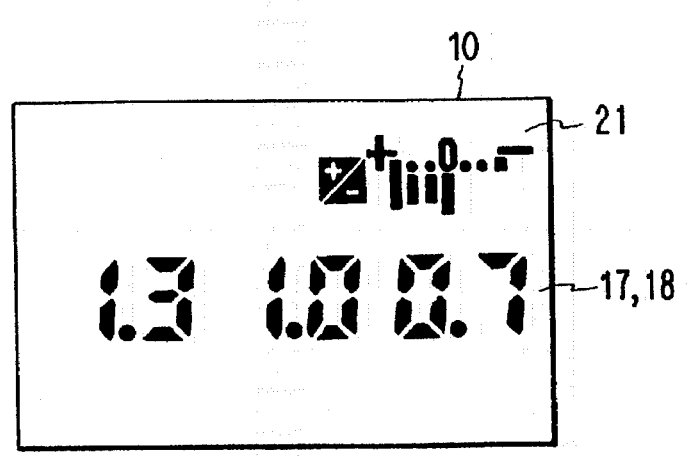
FIG. 26 is a view illustrating a displaying example of an exposure compensating mode when the compensating value 1.0 is set.
Figure 27:
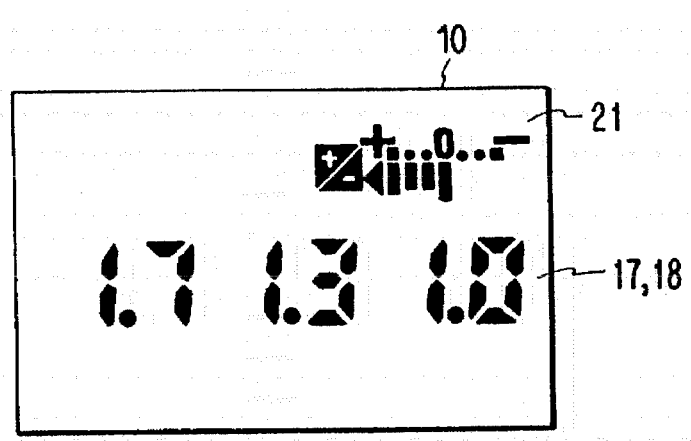
FIG. 27 is a view illustrating a displaying example of an exposure compensating mode when the compensating value 1.3 are set.
Figure 28:
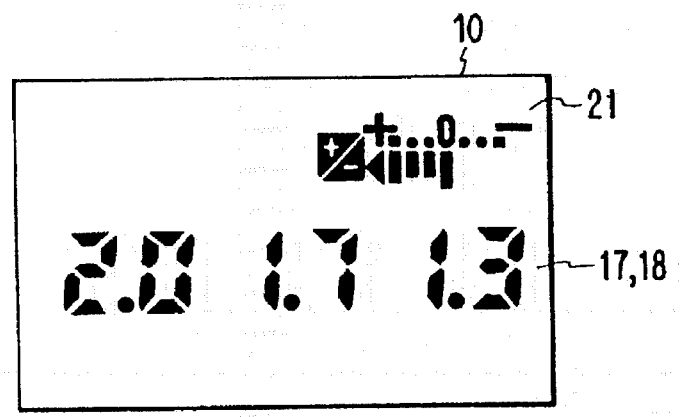
FIG. 28 is a view illustrating a displaying example of an exposure compensating mode when the compensating value 1.7 are set.

In the step S10 in FIG. 6, whether or not the exposure compensating mode has been selected by the mode switch 5 is examined. If the exposure compensating mode has been selected, the process proceeds to step S11 to execute the exposure compensating mode process subroutine shown in FIG. 22. If not selected, the process proceeds to step S12. In step S41 in FIG. 22, the stepping representation of the compensating zero value is displayed in the liquid crystal 21 as shown in FIG. 23 and at the same in the central liquid crystals 17 & 18 are displayed the compensating value 0.0 as well as a compensating value 0.3, which is one step over therefrom, on the left side thereof and a compensating value −0.3, which is one step under therefrom, on the right side thereof.

Next, in step S42, whether or not the setting dial 8 has been operated is examined. If operated, the process proceeds to step S43 to change the displays in accordance with the rotation of the setting dial 8. If, for example, the setting dial 8 is rotated in the direction to increase the compensating value, the compensating value which has been set in the central liquid, crystals 17 and 18 and the stepping representation in the liquid crystal 21 are increased step by step as shown in FIGS. 24 through 28 and at the same time the compensating values of one step over and one step under following the set compensating value are increased. Usually, a compensation of one to four steps, for example, is performed with respect to the exposing value which has been calculated. Therefore, the compensating value set by the setting dial 8 is displayed with the compensating values which are before and after it simultaneously, but it may be possible to display a range of compensating values that can be set. Also, when the setting dial 8 is rotated in the opposite direction, the compensating values are changed into the under side thereof. In step S42, if the setting dial 8 is not operated, the process returns to step S12 in FIG. 6.

Figure 29:
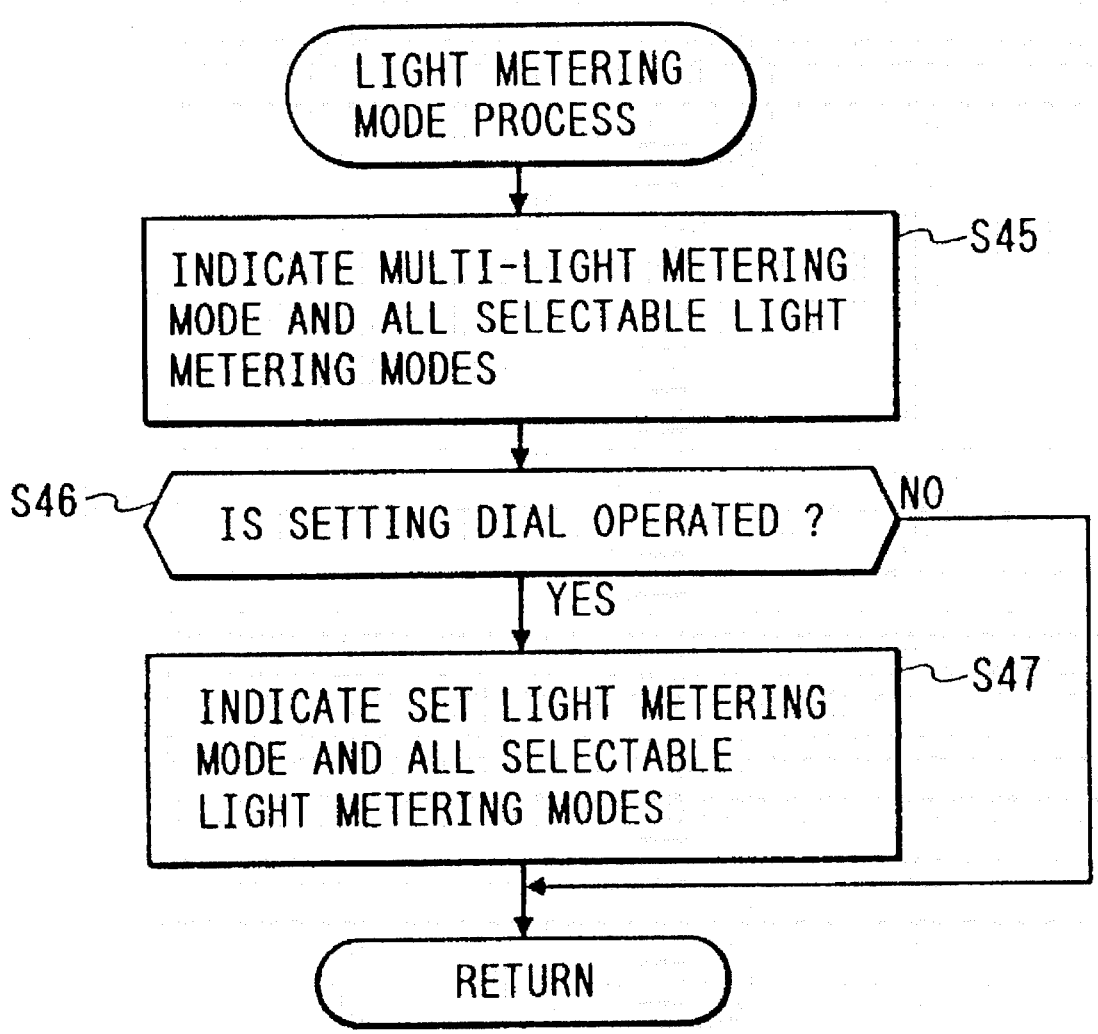
FIG. 29 is a flowchart showing the subroutine of a light metering mode process.
Figure 30:
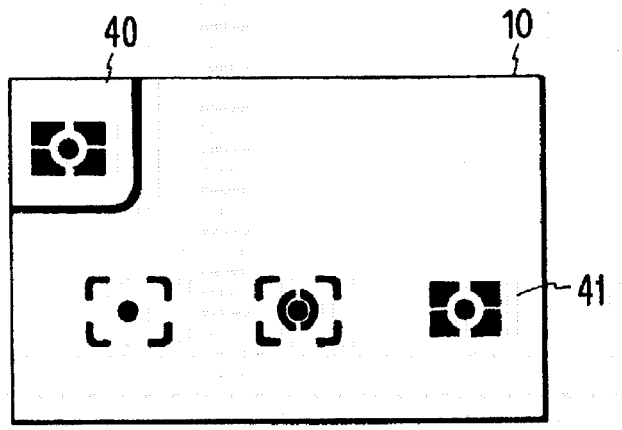
FIG. 30 is a view illustrating a displaying example of a light metering mode when a multi-light metering mode is set.

In the step S12 in FIG. 6 whether or not the light metering mode has been selected by the mode switch 6 is examined. If selected, the process proceeds to step S13 to execute the light metering mode process routine shown in FIG. 29. If not selected, the process proceeds to step S14. In S45 in FIG. 29, the multi-light metering mode sign which performs the known multi-pattern light metering calculation is set in the liquid crystal 40 as shown in FIG. 30 and at the same time, in the liquid crystal 41 are displayed the spot light metering mode signs indicating all the light metering modes which can be selected, i.e., multi-light metering mode, central portion preferential light metering mode, and spot light metering mode.

Figure 31:
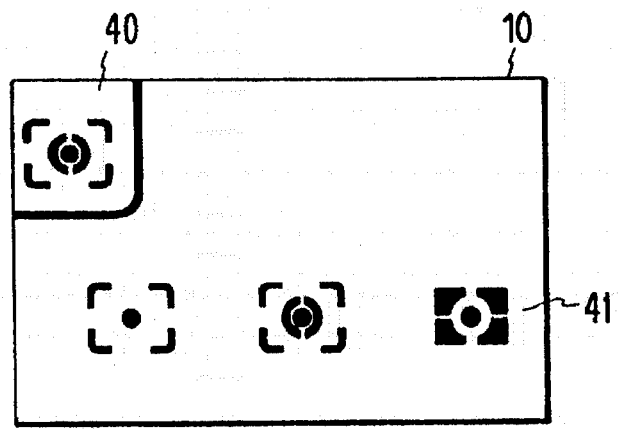
FIG. 31 is a view illustrating a displaying example of a light metering mode when a central portion preferential light metering mode is set.
Figure 32:
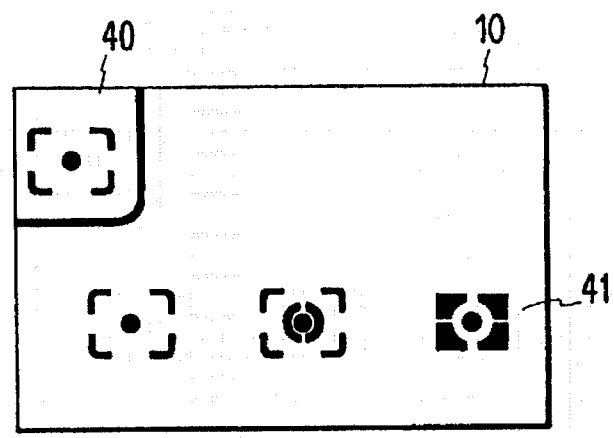
FIG. 32 is a view illustrating a displaying example when a spot light metering mode is set.

Subsequently, in step S46, whether or not the setting dial 8 has been operated is examined. If operated, the process proceeds to step S47 to display the selected light metering mode sign in the liquid crystal 40 and to display all the light metering mode signs that can be selected on the liquid crystals 41 simultaneously. Then, in the liquid crystal 40, the setting light metering mode signs are displayed sequentially as shown in FIG. 31 and FIG. 32 following the rotation of the setting dial 8. In the step S46, if the setting dial 8 is not operated, the process returns to step S14 in FIG. 6.

In the step S14 in FIG. 6, whether or not the shutter release button has been operated is examined. If operated, the process proceeds to step S15; otherwise, it returns to the step S2.

Figure 33:
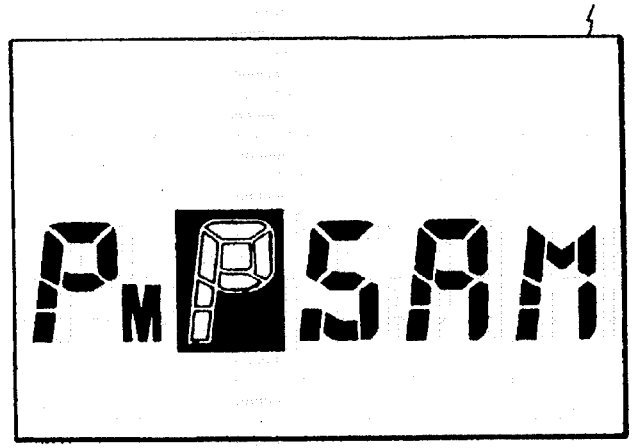
FIG. 33 is a view illustrating another displaying example when photographing information is set.
Figure 34:
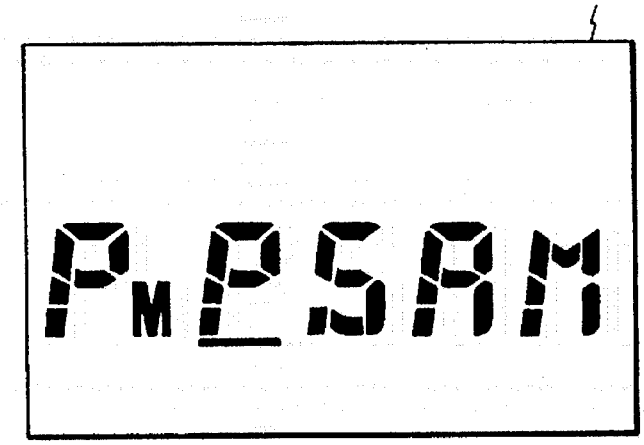
FIG. 34 is a view illustrating still another displaying example when photographing information is set.
Figure 35:
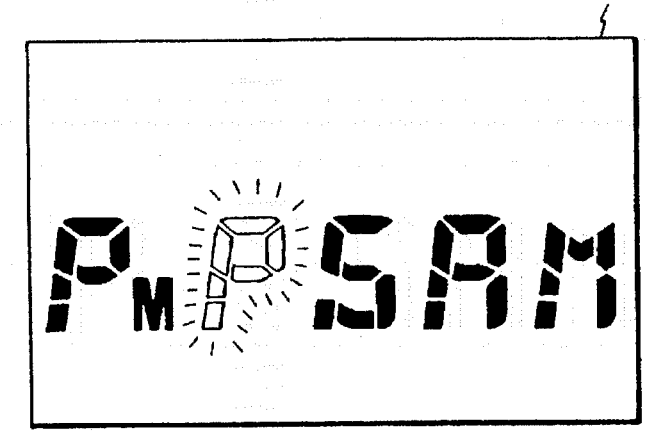
FIG. 35 is a view illustrating yet another displaying example when photographing information is set.

In the above-mentioned embodiment, the photographing information which has been set by the setting dial 8 is displayed in the liquid crystal 15 or in the center of the liquid crystal 16. However, as shown in FIG. 33, it may be possible to display the standard automatic exposing mode P, for example, inversely, or to display as shown in FIG. 34 the exposing mode P to be set with an attachable distinctive indicator representation such as under line, or to blink the representation of the exposing mode P as shown in FIG. 35 so as to distinguish it from the other photographing information by different states of display.

Also, the kinds of photographing information are not confined within the above-mentioned embodiment, but any other information can be adopted if only such information is for photography using a camera, a stroboscopic light adjusting mode, synchronous photographing mode, and the like, for example.

With the operation of the mode switches 1 through 6 for selecting the photographing information group, all the information or a part thereof contained in such a photographing information group selected are displayed so that the kinds of the photographing information contained therein and the information that can be selected are confirmed, thus making it possible to improve the operativity as well as to utilize the abundantly equipped photographing functions sufficiently.

In the structure of the embodiment set forth above, the mode switches 1 through 6 constitute information group selecting means; the setting dial 8, information setting means; the control circuit 9, display controlling means; and the display 10, displaying means, respectively.

As described above, according to the present invention, when any one of the photographing information groups is selected by an information selecting device, at least two pieces of photographing information contained in such a photographing information group selected are displayed, and further, when any photographing information is set by an information setting device, such a photographing information is displayed in a state where it can be distinguished from other pieces of the photographing information. As a result, the kinds of the photographing information contained in the selected photographing information group and the information that can be selected are confirmed, thus making it possible to improve the operativity and at the same time, to utilize the abundantly equipped photographing functions sufficiently.

What is claimed is:

1. A camera having a display for displaying photographing information, comprising:
   exposure means having a manual exposure mode and a plurality of automatic exposure modes;
   exposure mode selecting means for selecting one of said plurality of automatic exposure modes; and
   display means for simultaneously displaying all of said plurality of exposure modes in a first displaying portion, and for displaying an exposure mode selected by said exposure mode selecting means in a second displaying portion different from said first displaying portion.

2. A camera according to claim 1, wherein said first displaying portion is provided in a center of said display means, and said second displaying portion is provided in a corner of said display means.

3. A display apparatus for displaying photographing information for a camera, comprising:
   film supplying means having a single photographing supply mode in which a film is supplied by one frame and a continuous photographing supply mode in which the film is supplied continuously;
   supply mode selecting means for selecting one of said supply modes; and
   display means for simultaneously displaying all of said supply modes in a first displaying portion, and for displaying a supply mode selected by said supply mode selecting means in a second displaying portion different from said first displaying portion.

4. A display apparatus according to claim 3, wherein said first displaying portion is provided in a center of said display means, and said second displaying portion is provided in a corner of said display means.

5. A display apparatus for displaying photographing information for a camera, comprising:
   light metering means having a plurality of light metering modes;
   light metering mode selecting means for selecting one of said plurality of light metering modes; and
   display means for simultaneously displaying all of said plurality of light metering modes in a first displaying portion, and for displaying a light metering mode selected by said light metering mode selecting means in a second displaying portion different from said first displaying portion.

6. A display apparatus according to claim 5, wherein said first displaying portion is provided in a center of said display means, and said second displaying portion is provided in a corner of said display means.

7. A camera comprising:

a photographing control selection portion for selecting one photographing mode from among a plurality of photographing modes; and a display apparatus having a first displaying portion and a second displaying portion, said first displaying portion being adapted to display simultaneously all of said plurality of photographing modes selectable by said photographing control selection portion, and said second displaying portion being disposed in a position different from a position of said first displaying portion and being adapted to display one photographing mode selected by said photographing control section portion.

8. A camera having a photographing information setting apparatus, comprising:

a switch device to select a group from among a plurality of different kinds of selectable photographing information groups;

an information setting member which sets any one piece of photographing information from the selected photographing information group;

an electronic displaying device which displays the piece of photographing information set by said information setting member; and a display controlling circuit which, for each one of said photographing information groups when selected, drives said displaying device to display plural pieces of photographing information from that photographing information group simultaneously at corresponding predetermined positions, and which drives said displaying device so as to emphasize the display of the set piece of photographing information at its predetermined position in a manner that visually distinguishes the set piece of information from other photographing information of said plural pieces.

9. A camera according to claim 8, wherein said display controlling circuit causes said displaying device to display the set piece of photographing information inversely.

10. A camera according to claim 8, wherein said display controlling circuit causes said displaying device to display the set piece of photographing information in conjunction with a distinctive indicator.

11. A camera according to claim 8, wherein said display controlling circuit causes said displaying device to display the set piece of photographing information blinkingly.

12. A camera according to claim 8, wherein the same predetermined display positions are used to display the plural pieces of photographing informaiton from different photographing information groups.

* * * * *